United States Patent Office 2,869,392
Patented Jan. 20, 1959

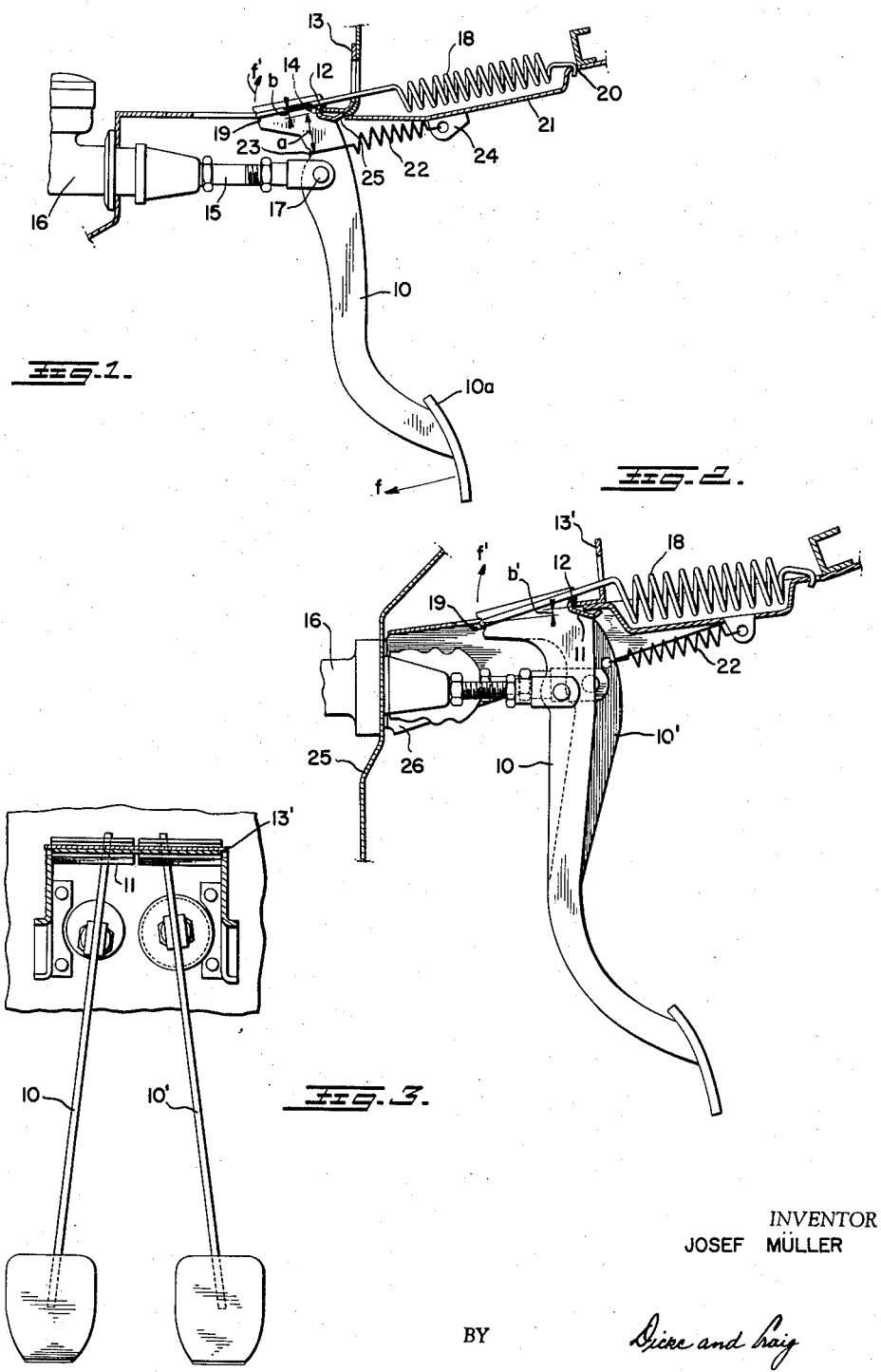

2,869,392

FOOT PEDAL ARRANGEMENT

Josef Müller, Stuttgart-Riedenberg, Germany, assignor to Daimler-Benz Aktiengesellschaft, Stuttgart-Unterturkheim, Germany Application August 9, 1956, Serial No. 603,120

Claims priority, application Germany August 13, 1955

11 Claims. (Cl. 74—512)

The present invention relates to a foot pedal arrangement, and more particularly to the suspension of a foot pedal or lever on the vehicle body or frame by means of a knife edge bearing support.

The usual pivot bearings for foot pedals of motor vehicles, especially for clutch and brake pedals, of the prior art, exhibit a relatively high degree of friction, particularly with inadequate lubrication thereof. Moreover, the manufacture and installation thereof is relatively complicated and expensive.

In contradistinction thereto, the present invention contemplates a bearing or suspension of the foot pedals or levers which is as simple and as inexpensive as possible in manufacture and assembly and which is also as frictionless as possible, and consists essentially in that the lever or pedal is pivotally supported on a knife edge, preferably by means of a rounded channel member made, for example, of sheet metal.

In order to increase the working life and durability as well as to achieve a steady and sturdy support of the foot pedal or lever, the latter is provided at the bearing or supporting place thereof with a part inserted therein, preferably welded thereto, which, for example, may be formed by an appropriately angularly bent sheet metal strip constituting the aforementioned rounded channel member.

A safe fixation of the installed suspended foot pedal is realized, for example, in that the lever is moved under the force of a spring against an abutment. If so desired, two springs may be provided which in the rest position of the lever or pedal tend to urge the same in the same direction of rotation or also two springs which in the rest position of the lever or pedal exert thereon differently strong opposite moments in such a manner that the lever or pedal is normally urged back to its rest position.

As a result thereof, the lever is retained springily on the knife edge thereof, yet may be removed in a very simple manner and without any difficulty from its suspended position by movement thereof in opposition to the spring force or after disengagement of the spring.

If two springs are used, one of these two springs may exert a spring force on the lever which increases with the stroke of the foot pedal in the direction of actuation thereof. Preferably, the additional spring may be so arranged as to pass through a dead center point during the actuating stroke of the foot pedal so that at first, prior to passing through the dead center point, the additional spring aids the effect of the return or main spring and, after passing through the dead center point, opposes the force exerted by the return spring.

Such a spring arrangement enables a relatively soft foot pedal actuation in that, instead of a spring characteristic which increases only slightly with the pedal stroke, a spring characteristic which remains constant or possibly also which decreases may be attained.

The levers or pedals are preferably arranged in a suspended manner. The part, for example, a curvedly bent sheet metal strip which serves as pivotal support for the foot pedal or lever and which may be inserted into an appropriate opening in the lever, may also serve simultaneously therewith as abutment to limit the stroke of the pedal and determine the normal rest position thereof.

The knife edges for the levers or pedals may be formed, for example, by the sheet metal walls or the floor or the like or also by special exchangeable sheet metal bearers. Two or more foot pedals or levers may be supported on a single knife edge.

Accordingly, it is an object of the present invention to provide a support of a foot pedal in motor vehicles which is reliable in operation, simple in manufacture, and easy in the installation or assembly as well as disassembly thereof.

Another object of the present invention is to provide a suspension for foot pedals or levers which requires no lubrication and which is as frictionless as possible.

Another object of the present invention is to provide an essentially frictionless bearing support for a motor vehicle foot pedal by the use of a knife edge support.

Still another object of the present invention is the provision of such foot pedals or levers and bearing supports therefor, which increase the working life and rigidity thereof as well as enhance the stable support of the pedals or levers.

A further object of the present invention resides in the provision of an arrangement for suspending foot pedals or levers in motor vehicles which requires no special parts as pivot bearings for the support of the pedals or levers at the vehicle body and which makes possible particularly favorable spring characteristics enabling soft actuation of the pedal.

Another object of the present invention is the provision of such a support and suspension of foot levers and pedals in motor vehicles as will enable easy removal of the assembly in case of repairs.

These and other objects, features and advantages of the present invention will become more obvious from the following description when taken in connection with the accompanying drawing, which shows, for purposes of illustration only, two preferred embodiments in accordance with the present invention and wherein:

Figure 1 is a side view, partially in cross section, of a foot pedal supported on a knife edge of a vehicle sheet metal part in accordance wit the present invention.

Figure 2 is a side view, partially in cross section, similar to Figure 1, showing the suspension of two foot pedals on a separate bearing or support member, and Figure 3 is a rear view of the two actuating pedals arranged side by side as shown in Figure 2 with certain parts omitted for sake of clarity.

Referring now more particularly to the drawing, wherein like reference numerals are used throughout the various views to designate like parts, and more particularly to Figure 1, reference numeral 10 designates a foot lever made of a sheet metal plate material. The foot lever 10 which is provided with a foot rest or plate 10a, constituting, for example, a clutch pedal or brake pedal, is suspendingly supported by means of a curvedly bent sheet metal strip 11, for example, welded thereto and forming a hollow round channel on the edge 12 of a vehicle sheet metal part 13, for example, of the dashboard, glove compartment, or the like. The "hollow-round" sheet metal strip 11 which is formed, for example by an essentially flat sheet metal strip bent back upon itself at one end thereof thereby forms an internal rounded channel by means of which the foot pedal or lever 10 is suspended on the knife edge 12 when the lever 10 and therewith the sheet metal strip are installed in such a manner that the knife edge 12 extends into this "hollow-round" channel. The hollow-round sheet metal strip is either inserted into a corresponding aperture in the lever and/or preferably is welded thereto. The knife edge 12 of the vehicle sheet metal part 13 may thereby be provided with a correspondingly shaped recess or aperture 14 to receive the pedal or lever 10 or to receive the inserted or welded-on sheet metal strip 11 so that the lever 10 is retained or fixed thereby in the lateral direction, when suspended. The rod 15 of the mechanism to be actuated by the foot pedal, for example, a control cylinder 16 for a hydraulically controlled clutch or brake, is connected with the lever 10 by means of a pivotal joint 17. A return spring 18 which, for example, may be relatively strong, is secured, on the one hand, in a notch or groove 19 of the lever 10 with a lever arm $b$ slightly above the supporting point 12 of the lever 10 on the vehicle body, and more particularly ahead of the supporting point 12, and on the other, in an aperture 20 or the like of a sheet metal member 21 welded to or otherwise secured to the sheet metal part 13. A second return spring 22 having, for example, more weak spring characteristics, which however, is arranged so as to have a relatively larger lever arm $a$ with respect to the supporting point 12, is connected, on the one hand, at 23 in a further groove or notch of the lever 10 and, on the other, at 24 in an aperture of the sheet metal member 21.

The sheet metal strip 11 is extended at the lower end thereof beyond the lever 10 so that the extended end 25 thereof which may also be bent appropriately slightly upwardly abuts against a part rigidly secured to the vehicle body, for example, the sheet metal part 13 or the like, due to the force exerted thereon by spring 22. The arrangement of the spring 18 is thereby chosen in such a manner that spring 18 acts initially on the foot pedal or lever 10 with a relatively small lever arm $b$ relative to the supporting point 12 thereof, that, however, with pivotal movement of the lever 10 in the direction of the arrow $f$ or of the notch 19 in the direction of the arrow $f'$ about the point of support at 12, the lever arm $b$ continuously increases so that the spring 18 exerts a spring force on the lever which supports or aids increasingly the actuating stroke and which equalizes increasingly the return force of the spring 22 or similar spring effects.

It becomes clear from the foregoing description that a separate pivot pin bearing for the pivotal support of the pedal or lever 10 at the vehicle body is obviated by the present invention. For purposes of the installation of the lever 10, it is only necessary to place the lever 10 on the knife edge of the vehicle part 13 by means of the hollow-round channel 12 from in front thereof and to thereupon engage the spring 18 in the notch 19 and the spring 22 in the notch 23.

In the embodiment according to Figures 2 and 3, two foot pedals 10 and 10', for example, a clutch pedal and a brake pedal, are arranged side by side one another and are each supported, similar as in the case of the embodiment according to Figure 1, by means of a strip 11, for example, welded thereto, on the same edge 12 serving as knife edge bearing and formed by an angularly bent sheet metal part 13'. The sheet metal part 13' is secured to a bearer 26 fastened to the vehicle frontal or transverse wall 27. The bearer 26 may be welded to the vehicle body at the frontal wall thereof or may be threadably secured thereto together with the control cylinder 16 of the clutch or brake cylinder.

Furthermore, the notch 19 in this embodiment is disposed in the illustrated rest position of the foot lever a distance $b'$ below the supporting point 12 in such a manner that upon depressing the foot pedal and therewith during movement of the notch in the direction of the arrow $f'$, the distance $b'$ is at first decreased up to the dead center point of the spring 18 where this lever arm is zero, and thereupon increases in the opposite direction. Consequently, the spring 18 at first aids the spring effect produced by spring 22 and after passing through the dead center point thereof exerts a spring force in opposition to that exerted by the spring 22 since the moments applied to the lever are in opposition to each other.

It is also understood that a similar dead center arrangement for the spring 18 may also be used in connection with the embodiment according to Figure 1, so that the lever arm $b$ thereof undergoes the same changes as lever arm $b'$.

While I have shown two preferred embodiments in accordance with the present invention, it is understood that the same is not limited thereto but is susceptible of many changes and modifications in accordance with the present invention, and I intend to cover all such changes and modifications except as defined by the appended claims.

I claim:
1. An arrangement for foot levers, especially for motor vehicles comprising a foot lever, means forming a knife edge secured to the vehicle body, rounded channel-like support means secured to said lever for supporting the same on said knife edge, and spring means connected to said lever for urging the same to the normal rest position thereof, said spring means including two springs, and one of said springs exerting an increasing moment on said lever in the direction of actuation thereof with an increasing actuating stroke of said lever.

2. An arrangement for foot levers according to claim 1, wherein said one spring is so connected with said lever that the lever arm of said one spring with respect to the point of rotation of said lever increases steadily in the direction of actuating said lever with the actuating stroke thereof.

3. An arrangement for foot levers, especially for motor vehicles, comprising a foot lever, means forming a knife edge secured to the vehicle body, rounded channel-like support means secured to said lever for supporting the same on said knife edge, and spring means connected to said lever for urging the same to the normal rest position thereof, said spring means including two return springs of different spring strength for exerting oppositely directed moments on said lever.

4. An arrangement for foot levers according to claim 3, wherein one of said springs passes through a dead center point during the actuating stroke of said lever so as to support at first the return force of the other spring and, after passing through said dead center point, to oppose said return force.

5. A suspension arrangement for pivotally securing foot levers to a relatively fixed part to enable ready installation and removal thereof, comprising a foot lever, means forming a knife edge secured to said relatively fixed part, rounded channel-like support means secured to one end of said lever for suspendingly supporting the same on said knife edge, and spring means connected to the same end of said lever and urging the same to the normal rest position thereof, and wherein said rounded channel-like support means simultaneously forms an abutment to limit the return stroke of said lever and determine said normal rest position thereof.

6. A suspension arrangement for pivotally securing foot levers to a relatively fixed part to enable ready installation and removal thereof, comprising a foot lever, means forming a knife edge secured to said relatively fixed part, rounded channel-like support means secured to one end of said lever for suspendingly supporting the same on said knife edge, and spring means connected to the same end of said lever and urging the same to the normal rest position thereof, said means forming a knife edge being constituted by the edge of a separate sheet-metal wall secured to said relatively fixed part and said relatively fixed part forming a transverse wall of the vehicle, further comprising control cylinder means operatively connected with said lever and means including said control cylinder means for securing said separate sheet-metal wall to said transverse wall.

7. A suspension arrangement for pivotally securing foot levers to a relatively fixed part to enable ready installation and removal thereof, comprising a foot lever, means forming a knife edge secured to said relatively fixed part, rounded channel-like support means secured to one end of said lever for suspendingly supporting the same on said knife edge, and spring means connected to the same end of said lever and urging the same to the normal rest position thereof, wherein said spring means includes two springs being of such different strength and acting on said lever with such lever arms relative to said axis of rotation thereof that the return force exerted by said spring means does not exceed the value thereof at the rest position of said lever.

8. In a motor vehicle having a body, a foot pedal comprising a lever having a transverse recess in one end thereof, a channel-shaped stop member disposed in said transverse recess and secured to said lever for providing an outwardly directed groove, a foot rest secured to the other end of said lever, and a control rod pivotally connected to the central portion of said lever, said vehicle body having a relatively fixed knife edge disposed in said groove and engaging said channel-shaped stop member for providing a fulcrum and pivotally supporting said lever, a first spring secured to said vehicle body at one end thereof and connected to said lever at the other end thereof at a point substantially opposite said knife edge, a weaker return spring secured to said vehicle body at one end thereof and secured to said lever at a point between said knife edge and said control rod at the other end thereof, said first spring acting in opposition to said weaker return spring and with increasing moment as said lever moves in a direction opposed to said weaker return spring.

9. In a motor vehicle having a body, a foot pedal comprising a lever having a transverse recess in one end thereof, a channel-shaped stop member disposed in said transverse recess and secured to said lever for providing an outwardly directed groove, a foot rest secured to the other end of said lever, and a control rod pivotally connected to the central portion of said lever, said vehicle body having a relatively fixed knife edge disposed in said groove and engaging said channel-shaped stop member for providing a fulcrum and pivotally supporting said lever, a weak lever return spring secured to said vehicle body at one end thereof and connected to said lever at the other end thereof at a point adjacent said control rod, a relatively strong spring secured to said vehicle body at one end thereof and connected to said lever at the other end thereof at a point opposite said knife edge, said relatively strong spring having a dual function of aiding said weak lever return spring in one position of said lever and acting in opposition to said weak lever return spring with increasing moment as said lever is moved in a direction opposed to said weak lever return spring.

10. In a motor vehicle having a body, a foot pedal comprising a lever, a foot rest secured to one end of said lever, and a control rod pivotally connected to the central portion of said lever, said lever being pivotally supported on said body, a first spring secured to said vehicle body at one end thereof and connected to said lever at the other end thereof at a point substantially opposite said pivotal support, a weaker return spring secured to said vehicle body at one end thereof and secured to said lever at a point between said pivotal support and said control rod at the other end thereof, said first spring acting in opposition to said weaker return spring and with increasing moment as said lever moves in a direction opposed to said weaker return spring.

11. In a motor vehicle having a body, a foot pedal comprising a lever, a foot rest secured to one end of said lever, and a control rod pivotally connected to the central portion of said lever, said lever being pivotally supported on said body, a weak lever return spring secured to said vehicle body at one end thereof and connected to said lever at the other end thereof at a point adjacent said control rod, a relatively strong spring secured to said vehicle body at one end thereof and connected to said lever at the other end thereof at a point opposite said pivotal support, said relatively strong spring having a dual function of aiding said weaker lever return spring in one position of said lever and acting in opposition to said weaker lever return spring with increasing moment as said lever is moved in a direction opposite to said weak lever return spring.

References Cited in the file of this patent

UNITED STATES PATENTS

| | | |
|---|---|---|
| 1,831,416 | Junkers | Nov. 10, 1931 |
| 2,250,394 | Reed | July 22, 1941 |
| 2,465,804 | Henricksen | Mar. 29, 1949 |
| 2,572,968 | Bachle | Oct. 30, 1951 |